Oct. 31, 1944.  F. E. JOHNSON  2,361,849
HYDRAULIC TABLE RECIPROCATING MECHANISM
Filed Feb. 10, 1942  2 Sheets—Sheet 1

Inventor
FRANKLIN E. JOHNSON
By Harold W. Eaton Attorney

Oct. 31, 1944. F. E. JOHNSON 2,361,849
HYDRAULIC TABLE RECIPROCATING MECHANISM
Filed Feb. 10, 1942 2 Sheets-Sheet 2

Inventor
FRANKLIN E. JOHNSON
By Harold W. Eaton Attorney

Patented Oct. 31, 1944

2,361,849

UNITED STATES PATENT OFFICE 2,361,849

HYDRAULIC TABLE RECIPROCATING MECHANISM

Franklin E. Johnson, Worcester, Mass., assignor to Norton Company, Worcester, Mass., a corporation of Massachusetts Application February 10, 1942, Serial No. 430,234

3 Claims. (Cl. 121—45)

The invention relates to grinding machines, and more particularly to a hydraulically operated table reciprocating mechanism.

One object of the invention is to provide a simple and thoroughly practical hydraulically operated grinding machine. Another object of the invention is to provide an improved hydraulically operated table reciprocating mechanism. Another object of the invention is to provide a hydraulically operated table reciprocating mechanism which may be stopped and reversed at precise predetermined positions to facilitate a shoulder grinding operation.

A further object of the invention is to provide a hydraulically operated table reciprocating mechanism, in which the table is stopped by a positive stop at a precise predetermined position, after which the table reverses. A further object of the invention is to provide a hydraulically operated table reversing mechanism which is stopped by a positive stop when reversed either manually or by table dogs to facilitate grinding of a shouldered work piece.

A further object of the invention is to provide a hydraulically operated table reciprocating mechanism which may be positively stopped at reversal by a positive stop mechanism and in which the table speed is reduced prior to stopping and reversing to facilitate table reversal. A further object of the invention is to provide a hydraulically operated table reversing mechanism which is arranged so that the rapidly reciprocating table is slowed down prior to reversal of flow of fluid to facilitate reversing at a predetermined position for a shoulder grinding operation. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of the invention, Fig. 1 is a hydraulic diagrammatic illustration of a grinding machine table reciprocating mechanism;

Figure 1:
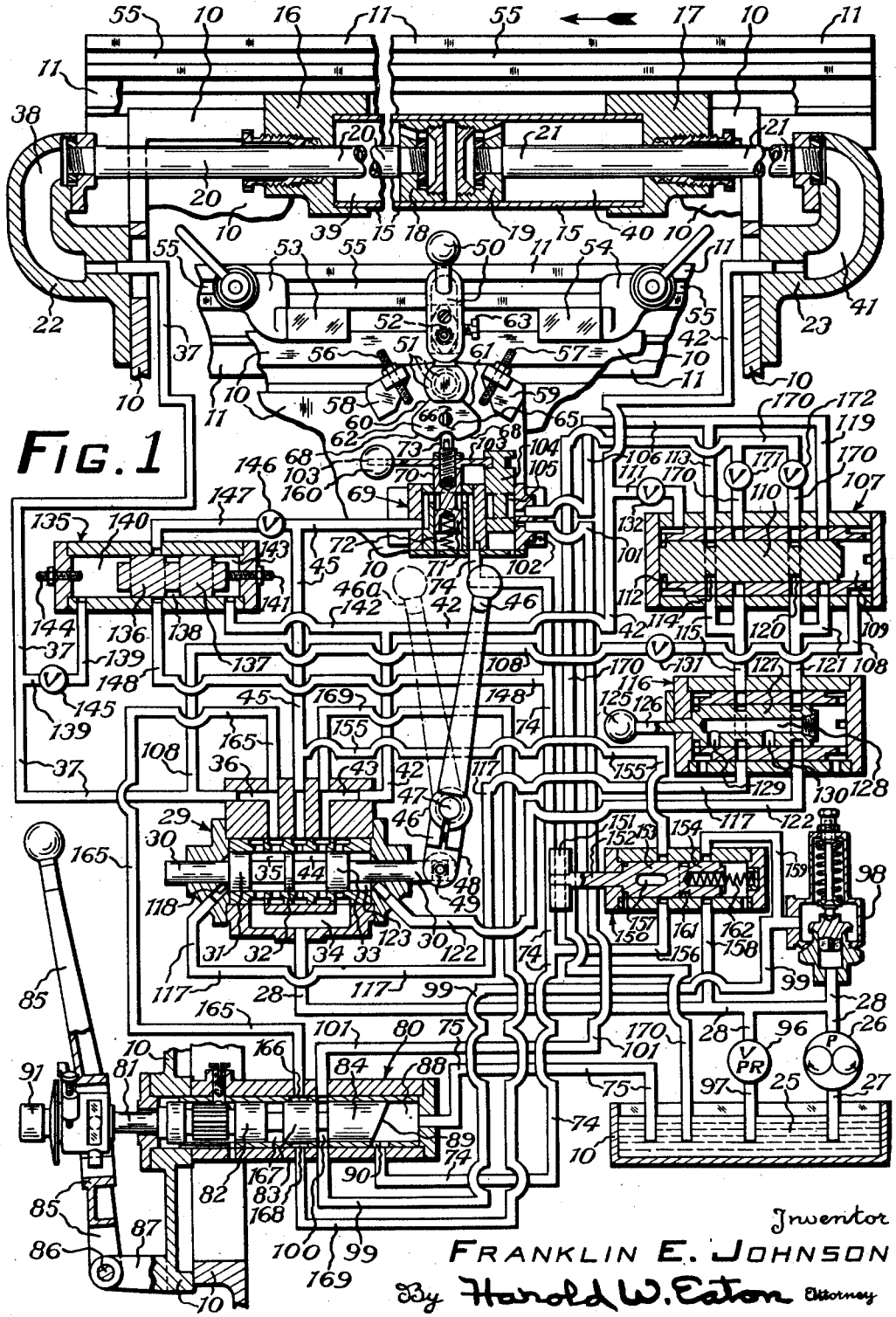

A grinding machine has been illustrated in the drawings, comprising a base 10 which supports a longitudinally reciprocable work supporting table 11 on a V-way 12 and a flat way 13 for a longitudinal reciprocatory movement relative to the base 10. A fluid pressure mechanism is provided for reciprocating the work table 11. A fluid pressure cylinder 15 is supported by cylinder head brackets 16 and 17 fixedly mounted on the under side of the table 11. The cylinder 15 contains a pair of spaced pistons 18 and 19 which are connected by a pair of hollow piston rods 20 and 21, respectively, with a pair of hollow brackets 22 and 23, respectively, which are fixedly mounted on the opposite ends of the base 10.

A fluid pressure system is provided for supplying fluid under pressure to the cylinder 15. This system may comprise a reservoir 25 contained within the base 10 of the machine. A motor driven fluid pump 26 draws fluid from the reservoir 25 through a pipe 27 and forces fluid under pressure through a pipe 28 to a table reversing valve 29. The table reversing valve 29 is a piston type reversing valve comprising a valve stem 30 having formed integrally therewith valve pistons 31, 32 and 33. Fluid under pressure passing through the pipe 28 enters a passage 34 in the reversing valve 29 and, in the position of the valve (Fig. 1), enters a valve chamber 35 located between the valve pistons 31 and 32 and passes out through a passage 36, a pipe 37, through a chamber 38 in the bracket 22, through the hollow piston rod 20, into a cylinder chamber 39 to move the cylinder 15 and table 11 toward the left (Fig. 1). During this movement, fluid within a cylinder chamber 40 is forced out through the hollow piston rod 21, through a chamber 41 within the bracket 23, through a pipe 42 and a passage 43, into a cylinder chamber 44 located between the valve pistons 32 and 33, respectively, and passes out through a pipe 45 in a manner to be hereinafter described and returns to the reservoir 25.

Figure 2:
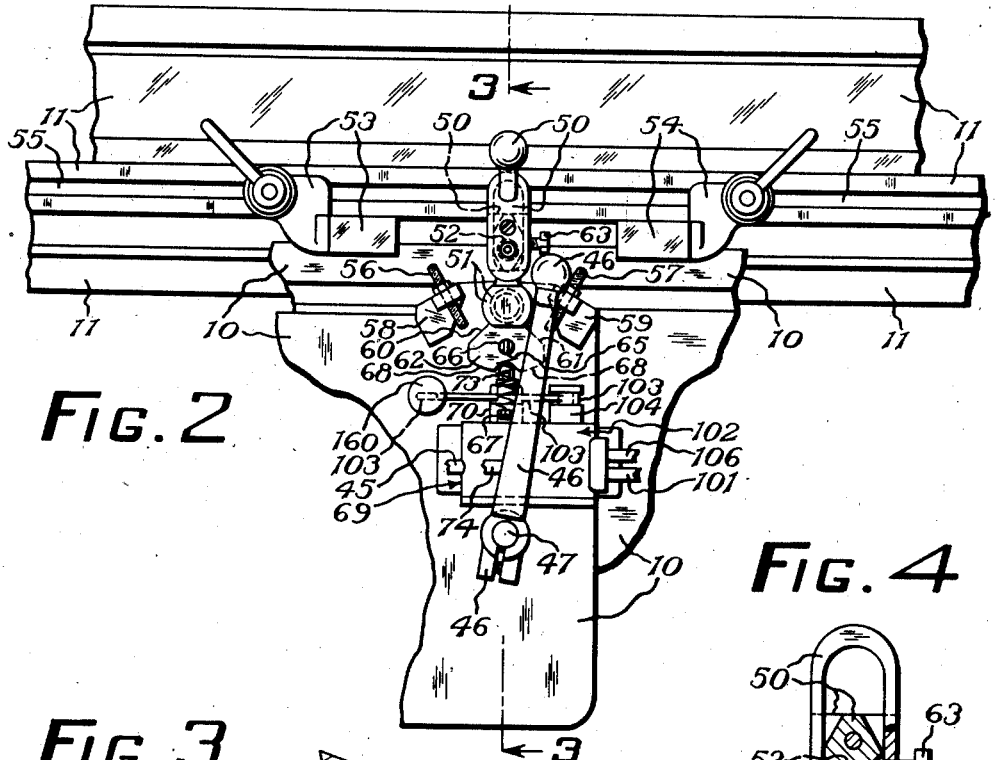
Fig. 2 is a fragmentary front elevation of a grinding machine embodying the invention.

The reversing valve 29 may be shifted manually by means of a pivotally mounted control lever 46 which is supported on a stud 47 which also supports at its inner end a downwardly projecting lever 48. A pin 49 is mounted on the lower end of the lever 48 and is connected with the valve stem 30. If it is desired to reverse the direction of movement of the table 11 manually, the control lever 46 is shifted manually in a clockwise direction into broken line position 46a to reverse the position of the valve 29 so that fluid under pressure from the pipe 28 passes into the valve chamber 44 and through the passage 43 and the pipe 42 to the cylinder chamber 40 to move the cylinder 15 and the table 11 toward the right (Figs. 1 and 2). The reversing valve 29 may be shifted either manually as above described or automatically by fluid under pressure, as will be hereinafter described.

In order to attain the main object of the invention, a positive stop mechanism is provided whereby the table 11 is precisely stopped at each reversal in a predetermined position so as to facilitate grinding up to and adjacent to a shoulder on a cylindrical work piece. A pivotally mounted lever 50 is supported on a stud 51 on the base 10 which is in turn fixedly mounted relative to the base 10. The stop lever 50 is provided with an inwardly projecting pin 52 which is arranged in the path of a pair of adjustably mounted table dogs 53 and 54. The table dogs 53 and 54 are adjustably supported by a T-slot 55 formed in the front edge of the table 11. A pair of adjustable stop screws 56 and 57 are supported in brackets 58 and 59, respectively, which are in turn fixedly supported relative to the base 10. The stop screws 56 and 57 are arranged to be engaged by stop surfaces 60 and 61, respectively, which are formed on a cam plate 62 which is preferably formed as an integral part of the lever 50.

It will be readily apparent from the foregoing disclosure that when the table 11 which is traveling toward the left (Fig. 1) approaches the end of its stroke, the dog 54 will engage the pin 52 and rock the stop lever 50 in a counterclockwise direction. This movement continues until the stop surface 61 engages the end of the stop screw 57 which serves positively to limit the longitudinal movement of the table 11 toward the right. Similarly, if the table 11 is traveling toward the right, this movement continues until the table dog 53 engages the pin 52 and rocks the stop lever 50 in a clockwise direction. This rocking movement of the stop lever 50 continues until the stop surface 60 engages the end of the adjustable stop screw 56 so as to positively limit the longitudinal movement of the table 11 toward the right. The swinging movement of the stop lever 50 serves in a manner to be hereinafter described to control the fluid pressure system so as to reverse the flow of fluid under pressure to the table cylinder 15 to reverse the direction of movement of the table 11 after it has been first stopped in a desired and predetermined end position.

The table stop lever 50 is preferably formed in two parts, one of which may slide relative to the other so that if desired the pin 52 may be raised to a position out of the path of the table dogs 53 and 54, respectively, to facilitate movement of the table beyond its normal stroke. A clamping screw 63 is provided for clamping the parts of the lever 50 with the pin 52 in the path of the dogs 53 and 54. The stop lever 50 is normally held in a central or vertical position by means of a tension spring 65, one end of which is connected to a stud 66 carried by the plate 62 of the lever 50. The lower end of the spring 65 is fastened to a stud 67 which is fixedly mounted to a part fixed relative to the base 10.

A cam face 68 on the lower end of the cam plate 62 is arranged to actuate a slow-down valve 69 which is mounted on the front of the base 10. The slow-down valve 69 is a piston type valve comprising valve pistons 70 and 71. A compression spring 72 normally serves to hold the valve pistons 70 and 71 in an uppermost position with an adjustable follower 73 in engagement with the cam face 68. The follower 73 is formed as a screw threaded member which is screw threaded within the piston 70 and arranged so that the follower surface thereof may be adjusted relative to the piston, thus serving to vary the position of the pistons 70 and 71 relative to the cam face 68 and thus varying the action of the valve 69. Fluid exhausting from the table reversing valve 29 through the pipe 45 enters a port connected to the chamber located between the valve pistons 70 and 71 of the slow-down valve 69 and passes out through a port connected to the exhaust pipe 74 and a pipe 75 into the reservoir 25.

It will be readily apparent from the foregoing disclosure that when the stop lever 50 is moved in either direction either by the table dog 53 or 54, the valve pistons 70 and 71 will be moved downwardly so as to gradually cut off the exhaust of fluid passing from the pipe 45 into the pipe 74 to gradually slow down the speed of the work table 11 before the stop lever 50 engages either the stop screw 56 or 57. By adjustment of the follower 73, the slow-down valve 69 may be regulated so that it gradually cuts off a portion of the exhaust of fluid from the pipe 45 as desired.

Figure 3:
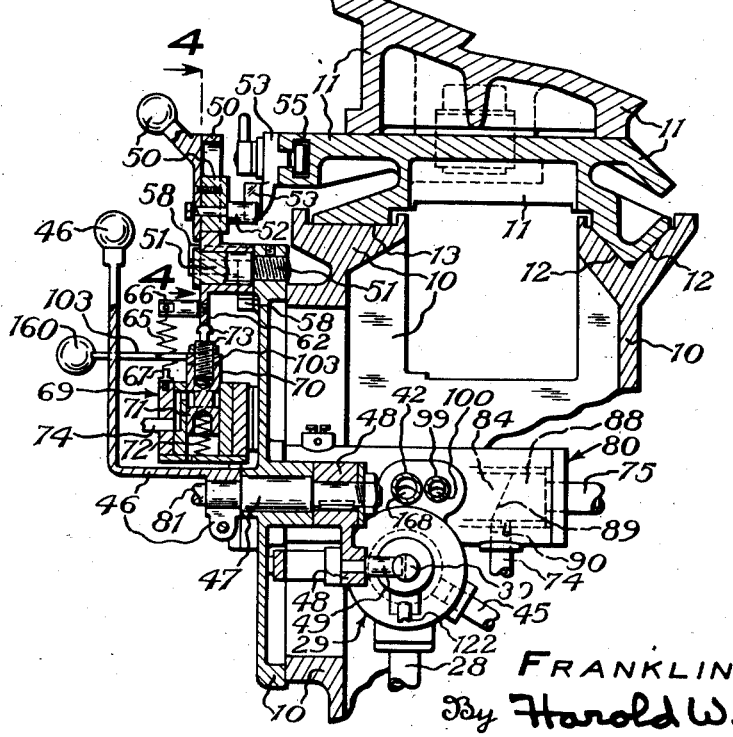
Fig. 3 is a cross sectional view, taken approximately on the line 3—3 of Fig. 2.
Figure 4:
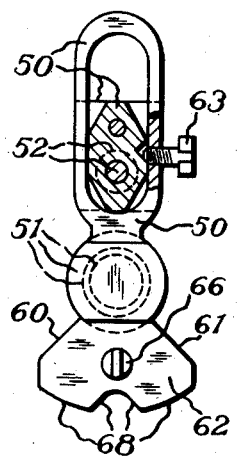
Fig. 4 is a fragmentary vertical sectional view, on an enlarged scale, taken approximately on the line 4—4 of Fig. 3, through the table stop lever.

In order to facilitate manual control of the table movement, it is desirable to provide a start and stop valve for starting and stopping the movement of the table 11. A start and stop valve 80 integral with the casing of the table reversing valve 29 (Fig. 3) is provided, which is a piston type valve comprising a valve stem 81 having formed integrally therewith valve pistons 82, 83 and 84. A manually operable start and stop lever 85 is pivotally supported by a stud 86 which is in turn supported by a bracket 87 fixedly mounted relative to the base 10. This start and stop valve 80 is substantially identical with that shown in the prior U. S. patent to Wallace H. Wood, No. 2,071,677 dated February 23, 1937, to which reference may be had for details of disclosure not contained herein. In the position of the valve 80 (Fig. 1), fluid exhausting through the pipe 74 enters a valve chamber 88 and passes unrestricted through the exhaust pipe 75 into the reservoir 25. When it is desired to stop the table movement, the lever 85 is rocked in a clockwise direction (Fig. 1) to shift the valve stem 81 toward the right so that the bevelled end surface 89 of the valve piston 84 closes a V-shaped port 90. The valve stem 81 may be manually rotated by a knob 91 to facilitate adjusting the bevelled end surface 89 in relation to the V-shaped port 90 when in an open position so as to control the rate of exhaust of fluid from the pipe 74 and thus control the speed of the longitudinal movement of the table 11.

In order to maintain the desired operating pressure in the fluid pressure system, an adjustable pressure relief valve 96 is connected to the pipe line 28 so that excess fluid under pressure within the pressure pipe 28 may be returned directly through a pipe 97 into the reservoir 25. A second adjustable pressure relief valve 98 is connected in the pipe line 28. This second relief valve may be set for a slightly lower pressure than the relief valve 96, and is arranged so that when the valve 69 is closed either manually or during reversal of the table, a back pressure is built up in the system which opens the relief valve 98 and passes fluid under pressure in a manner to be hereinafter described to actuate the reversing valve 29 by fluid under pressure. The relief valve 98 is connected by a pipe 99 with the valve 80. In the position of the valve 80 (Fig. 1), fluid passing through the pipe 99 enters a valve chamber 100 located between the valve pistons 83 and 84 and passes outwardly through a pipe 101 to a control valve 102. The control valve 102 is a piston type valve which is connected by a link 103 with the piston 70 of the slow-down valve 69 so that when the slow-down valve 69 is depressed during reversal, a movable piston 104 having a groove which engages the forked end of the link 103 of the valve 102 is moved downwardly so that fluid under pressure passing through the pipe 101 enters a valve chamber 105 in the valve 102 and passes outwardly through a pipe 106, through a shuttle type control valve 107.

The shuttle type valve 107 is actuated by pressure fluid from the reversing valve 29. The pipe 37 which passes fluid under pressure to the cylinder chamber 39 is connected by means of a pipe 108 with an end chamber 109 in the valve 107 so that when fluid under pressure is passed through the pipe 37 with the parts shown in the position illustrated in Fig. 1, fluid under pressure will pass through the pipe 108 into the end chamber 109 to move a valve piston 110 toward the left into the position illustrated in Fig. 1. Similarly, the pipe 42 which leads to the cylinder chamber 40 is connected by means of a pipe 111 with an end chamber 112 at the left-hand end of the shuttle valve 107 so that when fluid under pressure from the table reversing valve 29 is passed through the pipe 42 it will also pass through the pipe 111, into the end chamber 112, to move the valve piston 110 toward the right (Fig. 1). The speed of shifting of the shuttle valve may be controlled by a valve 131 in the pipe 108 and a valve 132 in the pipe 111.

In the position of the shuttle valve 107 (Fig. 1), when the valve 102 is depressed, fluid under pressure passing through the pipe 106 passes through a pipe 113, through a valve chamber 114, out through a pipe 115, and then passes through a selector valve 116 which will be hereinafter described, and out through a pipe 117 which conveys fluid under pressure to an end chamber 118 in the table reversing valve 29 to shift the reversing valve stem 30 toward the right (Fig. 1) so as to reverse the flow of fluid passing to the table actuating cylinder 15. It will be readily apparent from the disclosure as shown in Fig. 1 that no fluid passes into the end chamber 118 during the normal stroke of the table 11 since the control valve 102 is normally closed, except when actuated by the table actuated stop lever 50 at the end of the table stroke. The valve 102 is provided to prevent actuation of the reversing valve 29 during the normal reciprocatory stroke of the table 11 caused by a sudden increase in pressure within the system sufficient to open the relief valve 98. The valve 102 (Fig. 1) prevents passage of fluid by the relief valve 98 to the shuttle valve 107.

Similarly, when the table 11 is travelling in the opposite direction, fluid under pressure passing through the pipe 106 passes through a pipe 119 and through a valve chamber 120 which will then be positioned to coincide with the port at the end of the pipe 119 and passes through a pipe 121, through the selector valve 116, and through a pipe 122 to convey fluid under pressure to an end chamber 123 at the right-hand end of the reversing valve 29 to shift the valve stem 30 toward the left (Fig. 1) to reverse the valve 29 and thus change the direction of flow of fluid to the table cylinder 15. It will thus be seen that the shuttle valve 107 serves to control the passage of fluid under pressure automatically to the proper end chamber 118 or 123 of the table reversing valve 29 when the stop lever 50 is actuated to initiate a table reversal.

In order to permit a manual control of the table reciprocating movement, the selector valve 116 is provided with an actuating knob 125 which is mounted on the outer end of the valve stem 126 to control the admission to or exhaust of fluid from the end chambers 118 and 123, thereby controlling the movement of the table reversing valve 29 hydraulically or manually. The valve stem 126 has a valve piston 127 formed integrally therewith. The valve piston 127 is a hollow type piston having a central chamber 128. In the position of the valve piston 127 (Fig. 1), fluid under pressure passing through the pipe 115 may pass directly through the selector valve 116, into the pipe 117. Similarly, fluid under pressure passing through the pipe 121 may pass directly through the selector valve 116 and into the pipe 122, as above described. When it is desired to control the reciprocating or traversing movement of the table 11 manually by manual actuation of the reversing valve 29, the knob 125 of the valve 116 is moved toward the right (Fig. 1), which movement cuts off fluid under pressure within the pipe 115 or the pipe 121, so that the pipe 117 is connected with a port 129 and the pipe 122 is connected with a port 130 so that fluid within the end chambers 118 and 123 may readily pass through pipes 117 and 122 and through the central aperture 128 in the valve piston 127. Thus a direct by-pass of fluid between the end chamber 118 and the end chamber 123 is formed so that the reversing valve 29 may be readily shifted manually to control the longitudinal movement of the table 11.

When the table 11 approaches the end of its reciprocatory stroke, the valve 69 is gradually and partially closed by a rocking movement of the stop lever 50, as above described, which serves partially to cut off the exhaust of fluid from the table cylinder 15 to slow down the table movement prior to the engagement of the stop surfaces 60 or 61 with the stop screws 56 or 57, respectively. After the table reversing valve 29 has shifted, it is desirable that the flow of fluid be unrestricted through the exhaust pipe 74 so that the table 11 may be started rapidly in the reverse direction or adjusted from dwell control to grinding wheel infeed at the end of the table stroke at both ends. In order to accomplish this desirable result, a shuttle type valve 135 is provided, comprising a pair of spaced integral valve pistons 136 and 137, forming a valve chamber 138 therebetween.

When fluid under pressure is passed through the pipe 37 to the cylinder chamber 39, fluid under pressure may also pass through a pipe 139 into a valve chamber 140 to shift the valve pistons 136 and 137 to the extreme right-hand end position (Fig. 1). The movement of the valve pistons 136 and 137 toward the right is limited by means of an adjustable stop screw 141. Similarly, when fluid under pressure is passed through the pipe 42 to the cylinder chamber 40, fluid under pressure may also pass through a pipe 142, into an end chamber 143, to move the valve pistons 137 and 136 toward the left into an extreme left-hand end position, the left-hand end position being determined by means of an adjustable stop screw 144. The rate of movement of the valve pistons 136 and 137 may be regulated by means of a valve 145 in the pipe line 139.

The shuttle valve 135 serves upon reversal of the direction of flow of fluid to the table cylinder 15 to shunt fluid around the slow-down valve 69, thus allowing a quick unrestricted exhaust of fluid from the pipe 45 to facilitate a quick pick-up of the table movement in the reverse direction. The exhaust pipe 45 is connected to an adjustable valve 146 by a pipe 147 to the shuttle valve 135, so that during the longitudinal shifting movement of the valve pistons 136 and 137, fluid may exhaust through the pipe 147, through the valve chamber 138, and out through a pipe 148, thus shunting the exhaust around the slow-down valve 69 to instantaneously allow a quick pick-up movement of the table 11 in the reverse direction before the spring 65 has had time to return the valve pistons 70 and 71 to their uppermost position. The valve 146 in the pipe 147 serves as an additional means of regulating the flow of exhaust fluid. By shutting off the valve 146, the shuttle valve 135 may be rendered inoperative in case it is desired to reverse the table 11 without utilizing the shuttle valve 135.

For certain grinding operations, it may be desirable to provide a more rapid reverse action so that the effect of the slow-down valve 69 may be rendered inoperative. A manually operable valve 150 is provided, comprising a manually operable knob 151 mounted on the outer end of a valve stem 152. A pair of valve pistons 153 and 154 are formed integral with the valve stem 152. The exhaust pipe 45 leading from the table reversing valve 29 is connected by a pipe 155 with the valve 150. A pipe 156 connects the valve 150 with the exhaust pipe 74. If it is desired to render the effect of the slow-down valve 69 inoperative, the knob 151 is rotated 90 degrees so that exhaust fluid in the pipe 45 may flow through the pipe 155 and through a passage 157 which extends transversely through the valve piston 153 so that it may pass out through the pipe 156, the pipe 74, through the V-port 90, into the valve chamber 88, and out through the exhaust pipe 75, into the reservoir 25, thus shunting the exhaust fluid around the valves 135 and 69.

It may also be desirable during the operation of the machine to reverse the table 11 during its normal reciprocatory stroke. In order to accomplish this result, the fluid pressure pipe 28 is connected by means of a pipe 158 with the valve 150 and a pipe 159 is connected between the valve 150 and the pipe 99. A manually operable knob 160 which is formed as an integral part of the link 103 is provided for manually actuating the valves 69 and 102 when desired. If it is desired to reverse the table movement during a normal reciprocatory stroke, the operator may push the knob 151 to shift the valve 150 into its right-hand end position (Fig. 1) and at the same time manually depress the knob 160 to shift the valves 69 and 102 which serves to provide a slowing down and reversal of the table.

In this position of the valves 69 and 102, fluid from the pump 26 passing through the pipe 28 will pass through the pipe 158, through a valve chamber 161, and out through the pipe 159, through the pipe 99, the valve chamber 100, the pipe 101, through the valve chamber 105, the pipe 106, through the pipe 113, the valve chamber 114, the pipe 115, through the selector valve 116 and the pipe 117, into the end chamber 118 to shift the table reversing valve 29 into its reverse position. A compression spring 162 normally serves to hold the valve 150 in the position illustrated in Fig. 1. If a rapid reverse movement is desired during the normal stroke of the table 11, the knob 151 may be rotated ninety degrees and at the same time moved manually toward the right while the valves 69 and 102 are depressed, thus causing a shifting of the table reversing valve 29 and at the same time allowing fluid to be shunted around the valves 135 and 69 and directly into the reservoir 25 so that a quick manually controlled reverse movement of the table 11 may be obtained.

The table 11 may also be reversed during a normal reciprocatory stroke without actuation of the valve 150, if desired. The knob 160 may be depressed to shift the valves 69 and 102 downwardly which serves to cut off exhaust of fluid from the table cylinder, thereby to build up a back pressure in the fluid pressure pipe 28 which opens the relief valve 98 and passes fluid under pressure through the pipe 99, the valve chamber 100, the pipe 101, the valve chamber 105 in the valve 102, and through the valves 107 and 116 to shift the reversing valve 29 into a reverse position.

It is desirable to provide means whereby fluid may readily by-pass from the cylinder chamber 39 into the cylinder chamber 40 when the hydraulic table traversing or reciprocating mechanism is stopped to facilitate a manual adjustment of the table 11 when desired. A pipe or passage 165 connects the passage 36 in the table reversing valve 29 with a port 166 in the start and stop valve 80. When the start and stop lever 85 is shifted in a clockwise direction (Fig. 1) to close the V-port 90 to stop the hydraulic movement of the table 11, a valve chamber 167 moves into alignment with the port 166 and a port 168 so that fluid may readily pass from the pipe 165, through the valve chamber 167, and through a pipe 169 which connects with the passage 43 in the table reversing valve 29 and which connects with the pipe 42 leading to the cylinder chamber 40. It will thus be readily apparent that when the start and stop valve 80 is shifted to a table stop position, fluid may freely by-pass from the cylinder chamber 39 to the cylinder chamber 40 and vice versa without changing the setting of the shuttle valves 107 and 135, as the control lever 46 should not be touched during manual adjustment of the table 11.

The operation of the improved table reciprocating mechanism will be readily apparent from the foregoing disclosure. Assuming all of the parts to have been previously adjusted and the table 11 is traveling in the direction of the arrow (Fig. 1), that is, toward the left, this movement of the table 11 continues until the table dog 54 engages the pin 52 and rocks the table stop lever 50 in a counterclockwise direction so that the stop surface 61 engages the stop screw 57 which positively stops the table 11 in a predetermined position so as to facilitate the grinding of a work piece up to and adjacent to a shoulder.

During the rocking movement of the table stop lever 50, the follower 73 is gradually moved downwardly by means of the cam face 68 on the cam plate 62, causing a downward movement of the valve pistons 70 and 71 to partially cut off the exhaust of fluid from the table cylinder chamber 40 through the pipe 45. As the exhaust fluid is cut off, the pressure builds up within the system to open the relief valve 98 which allows fluid to pass through the pipe 99, the valve chamber 100, the pipe 101, the valve chamber 105, the pipe 106, the pipe 113, through the valve chamber 114, the pipe 115, through the selector valve 116 and the pipe 117, into the end chamber 118 of the table reversing valve 29 to shift the table reversing valve into its reverse position.

It will be readily apparent from the foregoing disclosure that when the table dog 54 rocks the table stop lever 50, the table 11 is gradually slowed down before the stop surface 61 engages the stop screw 57 positively to stop the table 11 in a predetermined position, after which the table reversing valve 29 is shifted to change the direction of flow of fluid under pressure so as to start the table 11 moving in the reverse direction. When the valve 29 is shifted into a right-hand end position by fluid under pressure, fluid from the pipe 28 then passes through the valve chamber 44, the passage 43, the pipe 42, into the cylinder chamber 40 to start the table 11 moving in a direction toward the right (Fig. 1). At the same time fluid under pressure passing through the pipe 42 passes through the pipe 111, the valve 132, into the end chamber 112 of the shuttle valve 107, to shift the shuttle valve piston 110 into its right-hand end position so that it is positioned for the next table reversal. At the same time fluid under pressure passes through the pipe 42, it also passes through the pipe 142 into the end chamber 143 of the shuttle valve 135 to shift the valve pistons 136 and 137 toward the left (Fig. 1) at a rate of movement as governed by the valve 145. As the port 138 passes the ports at the ends of the pipes 147 and 148, unrestricted exhaust of fluid may by-pass around the slow-down valve 69 through the chamber 138, the pipe 148, into the reservoir 10, thus allowing a quick pick-up of the table in its movement toward the right. During this shifting movement of the shuttle valve 135 and the by-passage of fluid therethrough, the table 11 moves away from the dog 54 so that the released tension of the spring 65 will allow the lever 50 to return to a vertical position (Fig. 1) and the slow-down valve under the influence of the compression spring 72 to move upwardly to the position shown in Fig. 1, so that thereafter unrestricted exhaust of fluid passing through the pipe 45 may pass through the slow-down valve 69 and the pipe 74 into the reservoir 10. The table 11 continues its movement toward the right (Fig. 1) until the adjustable table dog 53 engages the pin 52 to rock the table stop lever 50 in a clockwise direction to bring the stop surface 60 into engagement with the stop screw 56 thus to positively stop the table 11 from moving toward the right. Thereafter the relief valve 98 opens due to back pressure within the system which operates in a manner above described to convey fluid under pressure through the fluid pressure system into the end chamber 123 of the table reverse valve 29 to shift it toward the right into the position shown in Fig. 1 again to reverse the direction of movement of the table 11. It will thus be seen that a hydraulic table reciprocating mechanism has been provided whereby the table 11 may be reciprocated through a precise stroke so that work pieces having one or more shoulders may be accurately ground since the movement of the table 11 is positively limited at the point of reversal to accurately locate a work piece relative to the operating tool. When it is desired to stop the hydraulic movement of the table 11, the stop and start lever 85 may be shifted in a clockwise direction (Fig. 1) to close the V-port 90, thus cutting off the exhaust of fluid from the entire system and thereby stopping the reciprocating movement of the table 11.

Fluid from the end chambers 118 and 123 of the table reversing valve 29 may exhaust through either the valve chamber 114 or 120, respectively, of the shuttle valve 107, depending upon its position, and pass outwardly through a pipe 170 which exhausts directly into the reservoir 25. A pair of adjustable valves 171 and 172 located in the piping 170 from the shuttle valve 107 serve independently to regulate the exhaust of fluid from either the end chamber 118 or the end chamber 123, respectively, thus serving to control the rate of shifting of the table reversing valve 29 during reversal so that the period of reversal may be regulated as desired.

If it is desired to operate the table 11 by manual actuation of the control lever 46, the knob 125 of the selector valve 116 is moved toward the right (Fig. 1), which movement shifts the valve stem 126 so that a direct by-pass of fluid is obtained between the end chambers 118 and 123 of the table reversing valve 29 so that the table reversing valve may be readily shifted under the control of the manually operable control lever 46, thus facilitating a manual controlled movement of the table 11 either for a grinding wheel truing operation or otherwise, as desired.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a longitudinally reciprocable table, means including a piston and cylinder to reciprocate said table, a reversing valve therefor, fluid chambers in the ends of said valve whereby admission of fluid under pressure thereto serves to reverse the same, a source of fluid under pressure, means including adjustable table dogs and fixed stop screws positively to limit the reciprocatory movement of the table in either direction, a slow-down valve actuated by said dogs to throttle the exhaust of fluid from said cylinder at reversal gradually to slow down the table, an adjustable pressure relief valve, connections between said relief valve and the source of fluid under pressure, means including connections between said relief valve and the end chambers of said reversing valve whereby positive stopping of the table serves to build up a back pressure to open said relief valve and admit fluid under pressure to an end chamber to shift said reversing valve and thereby to reverse the direction of movement of the table, and a pressure actuated by-pass valve to by-pass fluid around said slow-down valve at the beginning of the table movement and/or during reversal rapidly to start the table in the reverse direction.

2. In a grinding machine having a base, a longitudinally reciprocable table, means including a piston and cylinder to reciprocate said table, a reversing valve therefor, fluid chambers in the ends of said valve whereby admission of fluid under pressure thereto serves to reverse the same, a source of fluid under pressure, means including adjustable table dogs and fixed stop screws to limit the reciprocatory movement of the table in either direction, a pivotally mounted control lever which is actuated by said dogs, a slow-down valve which is actuated by movement of said lever to slow down the table movement, as it approaches the end of its stroke by throttling the exhaust of fluid from said cylinder, an adjustable pressure relief valve, connections between said relief valve and the source of fluid pressure, means including connections between said relief valve and the end chambers of said reversing valve whereby positively stopping of the table serves to build up a back pressure to open said relief valve and admit fluid under pressure to an end chamber of the reversing valve to shift the reversing valve and thereby reverse the direction of movement of the table, and a shuttle valve which is operatively connected to the slow-down valve so as to by-pass fluid around said slow-down valve at the beginning of the table movement and/or during reversal to facilitate a rapid starting of the table in the reverse direction.

3. In a grinding machine having a base, a longitudinally reciprocable table, means including a piston and cylinder to reciprocate said table, a reversing valve therefor, fluid chambers in the ends of said valve whereby admission of fluid under pressure thereto serves to reverse the same, a source of fluid under pressure, a pivotally mounted stop lever on said base, adjustable table dogs to actuate said lever, a pair of stop screws positively to limit the movement of said lever and thereby to limit the reciprocatory movement of the table in either direction, a slow-down valve actuated by said dogs to throttle the exhaust of fluid from said cylinder during reversal gradually to slow down the table, an adjustable relief valve, fluid connections between said relief valve and the source of fluid under pressure, means including fluid connections between said relief valve and the end chambers of said reversing valve whereby positive stopping of the table serves to build up a back pressure to open the relief valve and admit fluid under pressure to an end chamber so as to shift the reversing valve and thereby reverse the direction of movement of the table, and a by-pass valve actuated by reversal of fluid under pressure to said cylinder to by-pass fluid around said slow-down valve at the beginning of the table movement and/or during reversal to facilitate a rapid starting of the table in the reverse direction.

FRANKLIN E. JOHNSON.